June 10, 1958  A. G. CLARK  2,838,034
MONOFUEL INTERNAL DECOMPOSITION ENGINE
Filed March 7, 1955
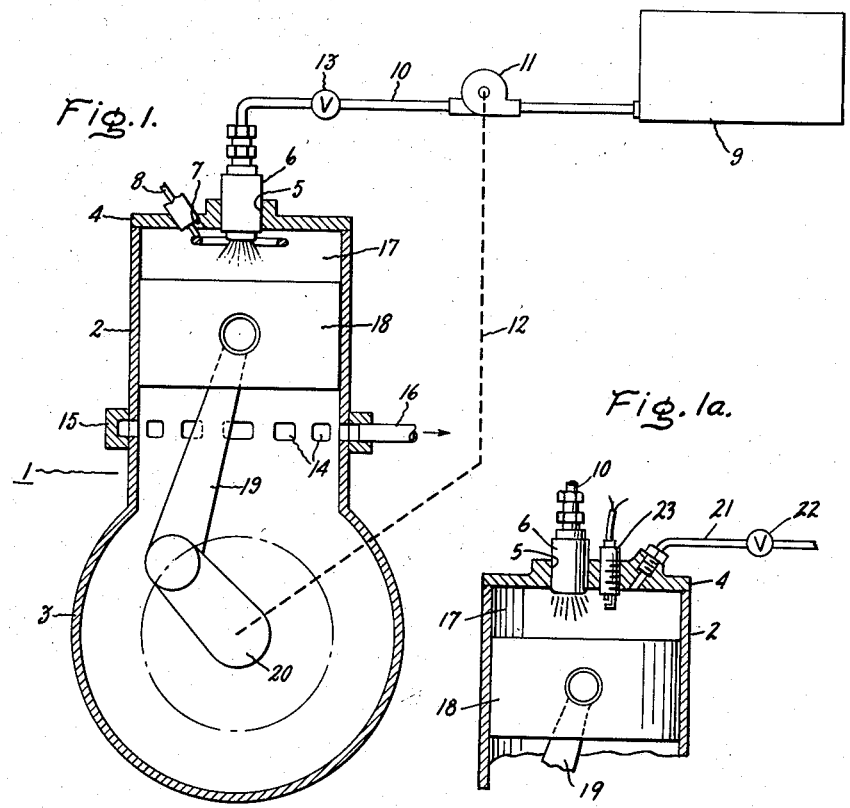
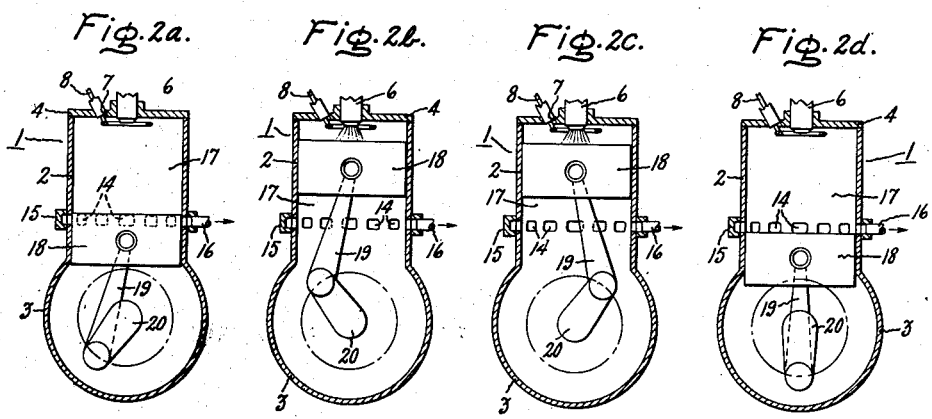
Inventor:
Albert G. Clark,
by Merton D. Morse
His Attorney.

United States Patent Office 2,838,034
Patented June 10, 1958

2,838,034

MONOFUEL INTERNAL DECOMPOSITION ENGINE

Albert G. Clark, Ballston Lake, N. Y., assignor to General Electric Company, a corporation of New York Application March 7, 1955, Serial No. 492,692

10 Claims. (Cl. 123—65)

My invention relates to internal decomposition engines. More particularly it relates to a reciprocating internal decomposition engine which utilizes a monofuel and can operate in the absence of air, separate oxidizer or additional reactant.

With the increased use of aircraft and jet propulsion devices such as rockets, guided missiles and the like, a requirement for prime movers for starting engines and driving electric generators, pumps, compressors and other equipment has developed. There is also a need for improved main propulsive devices for various vehicles including torpedoes. It is desirable that prime movers such as the above operate in the absence of air or separate oxidizer since it will be appreciated that in many such applications an ambient oxidizing or reactant atmosphere is not present. It is further desirable that a second reactant be eliminated if possible, since it adds to the complexity of the installation with a resultant decrease in reliability. As a result of the above considerations turbines driven by hot gases generated from the decomposition or combustion of monofuels or monopropellants have been developed. Alkylene oxides and alkyl nitrates typified by ethylene oxide and the methyl, ethyl and propyl nitrates are representative of monofuels which can be used in such installations.

While monofuel-driven turbines are useful in applications where power is required only for short periods of time, their relatively low efficiency and high rate of fuel consumption militate against their use where a driving force is required over an extended period of time. To use such monofuel propelled turbines for enduring power requirements would again return them to the category of prime movers requiring a separate oxidizer or reactant insofar as reactant storage requirements are concerned.

Internal combustion engines because of their higher thermal efficiency as compared to hot gas turbines would be a most desirable substitute for such turbines for prime movers which must operate over a relatively extended period of time. However, here again in the usual engine of such type a separate oxidizer or reactant is required along with separate pumping and injection means and their resultant weight and space requirements.

While internal combustion or decomposition engines may be operated with slow burning explosive powders such as smokeless powder, such powders are not readily or conveniently made available or fed to the combustion space of such an engine.

An object of my invention is to provide an internal decomposition engine and a method for operation thereof which uses a monofuel.

Another object of my invention is to provide an improved prime mover which operates in the absence of a separate reactant.

A further object is to provide such a prime mover which is light in weight and will operate over extended periods of time with desirable efficiency.

A still further object of my invention is to provide such an engine which will operate efficiently under varying ambient pressures.

Briefly stated my invention comprises a two-stroke internal decomposition engine which utilizes a monofuel or which operates without a separate reactant.

The features of my invention which are believed to be novel are set forth with particularity in the claims appended hereto. My invention itself, however, both as to its organization and method of operation, together with further objects and advantages thereof may best be understood by reference to the following description and the drawing in which Fig. 1 is an elevational view partly in cross section of my engine and Figs. 2a through 2d are elevational views partly in cross section of my engine illustrating various phases of the two-stroke cycle.

Referring to the drawing, there is shown in Fig. 1 an internal decomposition engine 1 having a cylinder 2 and a crankcase 3. Cylinder 2 is closed at its upper end in any usual well-known manner by a head 4. Cylinder head 4 is provided with several holes or apertures. In one aperture 5 is placed a nozzle or injector 6 for the introduction of monofuel to the cylinder 2. This nozzle may be any of a number of well-known types which provide a finely divided spray.

Located in aperture 7 through head 4 is monofuel heating and igniting means 8 which is conveniently used while initiating the operation of the engine, particularly where powerful cranking means is not available. Heating and ignition means 8 is shown as a glow plug having a ring or annular shape which is actuated in the usual manner. The heating and igniting means may also be an explosive cartridge which is usable only once and also utilizes much less power than a glow plug type of heater and igniter. A spark plug may be used but must generally be used in conjunction with other heating such as the heating due to compression of the cylinder gases.

Monofuel is fed to nozzle 6 from a supply source 9 through conduit 10. In order to pressurize the fuel a pump 11 or other well known pressurizing means is situated in conduit 10. This pressurizing means is conveniently driven by the engine 1 as indicated by broken line 12. A valve 13 is also provided in conduit 10. To insure that injection takes place at the proper time in the engine operating cycle, a timing mechanism, not shown, of any well known suitable type is provided.

In the lower portion of cylinder 2 is means for exhausting excess combustion gases from the cylinder. Typically this means can be in the form of one or more exhaust ports 14 through the cylinder wall as shown. An annular shroud or manifold 15 can be placed if desired over these parts to gather the exhaust gases for delivery to a single outlet pipe 16. The exhaust means is located below that part 17 of the cylinder traversed by the piston, the full extent of which is best shown in Fig. 2a.

Mounted in cylinder 2 and adapted for movement therein is piston 18 of any usual design having attached thereto a connecting rod 19 which in turn is connected to crank shaft 20 within crank case 3, and thence to a load.

It will be noted that the internal decomposition engine 1 of my invention has no scavenging gas or air inlet ports since it operates with a monofuel requiring no separate oxidizer or additional reactant. Neither need the residual gaseous combustion products be scavenged from the cylinder, such residual gases being compressed and monofuel injected directly thereinto.

In order to initiate the decomposition of a monofuel certain minimum conditions of pressure and temperature must be met which vary with the particular fuel used. Once these conditions are attained, the monofuel will decompose until the supply is exhausted. For an alkyl nitrate such as normal propyl nitrate the minimum temperature is about 400° C. and the minimum pressure about 100 pounds per square inch. These conditions may be obtained in any of a number of obvious ways. For example, as shown in Fig. 1a, a pressurized oxidant such as air may be injected through a suitable conduit 21 controlled by valve means 22 into the combustion chamber along with monofuel and the mixture ignited as with a spark plug 23, the gases from the burning fuel increasing the pressure and temperature to at least the necessary minimum values, whereupon the ignition means and oxidizer are cut off with further combustion proceeding without further external or separate ignition or pressurization. Alternatively the monofuel may be injected into an atomized spray to produce the requisite minimum pressure by the boiling of the liquid caused by such heating means as a glow plug or the like until it is ignited, when again the heating means can be shut off.

In still another case a slow burning solid propellant such as smokeless powder or the like may be used for pressurizing as well as igniting the monofuel. However, such solid propellants normally leave an objectionable solid residue.

While it will be seen that any of a number of ways may be utilized in initiating the operation of my monofuel internal combustion engine, I prefer to use external means to crank the engine to produce the requisite minimum combustion pressure and to use a heating means such as a heated annulus, glow plug, or the like to help heat the compressed atomized monofuel-residual cylinder gas mixture. The cranking can be provided for in any of a number of ways well known to those skilled in the art. If the engine is serving in an auxiliary role as in operating pumps or alternators in a guided missile, an external source of energy can be used for this purpose. Where the internal combustion engine is to be used as a main power source or prime mover, a gas generating powder cartridge starter can be used for cranking. If the cranking source is powerful enough, the pressure and heat generated by the cranking alone may be sufficient to ignite the monofuel residual gas combustible mixture without need for separate heating or igniting means. However, in order to reduce the size, weight, and complexity of the cranking mechanism, I prefer to provide a glow plug or similar device to help heat the compressed gas.

In starting my engine, then, I heat glow plug 8 and crank the engine by some external means. With the fuel injector system and nozzle coordinated by any well known means, not shown, to inject monofuel into the combustion chamber preferably just before the piston reaches top dead center of the compression stroke and slightly thereafter, the heating means ignites the combustible mixture, the pressure from which drives the piston downward. Once the engine has started the heating means 8 is shut off either manually or automatically.

With the engine started, the operating cycle is as follows. Referring to Fig. 2a, the piston is shown at just past bottom dead center position and at the beginning of the compression stroke. The heating means is, of course, inactive and a large part of the gases resulting from the combustion process has been exhausted through ports 14 and pipe 16. Only residual combustion gases remain in the cylinder but this is at a high enough temperature to ignite the monofuel. From the position of Fig. 2a, piston 18 proceeds upward compressing the residual gas until it reaches top dead center. However, preferably as is usual practice in internal combustion engines just before top dead center or the position of the piston in Fig. 2b, the fuel system is timed to inject monofuel through nozzle 5 into the combustion chamber containing the hot compressed residual exhaust gas from the previous power stroke. The fuel injection normally extends in time to a point just past top dead center about the position of Fig. 2c. However, the exact schedule for fuel injection is not of the essence so long as satisfactory operation is obtained, such schedule depending on the fuel, pressure, temperature, etc. and being readily freed for optimum operation by those skilled in the art. With the monofuel ignited, the expanding hot combustion gases force piston 18 downward on the power stroke. As bottom dead center is approached exhaust ports 14 are opened with full opening at or before but preferably at bottom dead center as shown in Fig. 2d. With exhaust ports 14 open, the pressure in the combustion chamber is relieved and all but residual exhaust gases flow from the chamber through exhaust pipe 16. From bottom dead center the piston returns to the position of Fig. 2a with the cycle repeating.

It will be understood that while I have described my internal decomposition engine as having only one cylinder, it may have as many as are desired. Likewise, the engine may be made in any of the usual configurations of internal combustion engines such as opposed piston and the like. It will be understood even though specific equipment is not shown, my engine will be lubricated and cooled in accordance with accepted practices. Likewise, the timing mechanism for fuel injection may be varied as desired.

It will be apparent that by my invention there is provided a convenient means for producing a driving power over relatively long periods of time where a separate reactant oxidizer or air is not available or where the provision of an extra reactant is impractical for one reason or another. My engine is further more efficient than a turbine driven by the hot gases resulting from the decomposition of monofuel and more practical for use over long periods of time.

My engine as opposed to turbine power plants is not sensitive to back pressures. Tests show that the fuel consumption of a turbine power plant operating over pressures ranging from atmospheric to 500 pounds per square inch varies in a ratio or over two to one. This increase in fuel consumption is attributable to increasing back pressure. Using my engine, the power output is essentially independent of back pressure since the initial pressure also increases.

While I have described my invention with regard to certain embodiments it will be realized that I desire, by the claims appended hereto to encompass all modifications of the invention which do not depart from the spirit or scope of those claims.

What I claim as new and desire to secure by Letters Patent of the United States is:

1. The combination in a reciprocating engine adapted for use of monofuel without injection of separate reactant comprising in combination a cylinder closed at one end, a piston arranged to reciprocate in said cylinder, means to inject monofuel into said cylinder when its piston is substantially at one end of its stroke in time to be ignited solely by the heat from the compressed residual exhaust gases in said cylinder and exhaust ports near the opposite end of said cylinder arranged to be opened when said piston is at said opposite end.

2. The combination in a reciprocating engine adapted for use of monofuel without injection of separate reactant comprising in combination a cylinder closed at one end, a piston arranged to reciprocate in said cylinder, means to inject monofuel in said cylinder when its piston is substantially at one end of its stroke in time to be ignited solely by the heat from the compressed residual exhaust gases in said cylinder, and exhaust ports near the opposite end of said cylinder arranged to be opened when said piston is at said opposite end and heating and ignition means to additionally heat said gases to produce ignition of said monofuel during the initial strokes of starting said engine.

3. An internal decomposition engine for monofuel comprising at least one cylinder closed at one end and a piston therein, monofuel injection and ignition means in said cylinder, sole exhaust means in said cylinder to exhaust said cylinder only when said piston is near bottom dead center, said cylinder being otherwise closed off throughout the stroke of said piston to thereby permit retention and compression of residual exhaust gases in said cylinder, and means to connect said piston to power output means.

4. An internal decomposition engine for monofuel comprising at least one cylinder, a cylinder head, monofuel injection and ignition means mounted in said head, sole exhaust means comprising ports in the side of said cylinder, a piston adapted for movement in said cylinder, said exhaust ports being positioned to be alternately covered and uncovered by said piston, said cylinder being otherwise closed off throughout the piston stroke cycle to thereby allow retention and compression of residual exhaust gases in said cylinder, and mechanical linkage means connecting said piston to power output means.

5. An internal decomposition engine for monofuel comprising at least one cylinder closed at one end, monofuel injection and ignition means in said cylinder, a piston in said cylinder, sole exhaust means comprising ports in said cylinder just above the bottom dead center position of said piston, said cylinder being otherwise closed off throughout the stroke of said piston to thereby permit retention and compression of residual exhaust gases in said cylinder, the injection of monofuel into said cylinder being limited to that portion of the piston stroke near top dead center position, and means for connecting said piston to power output means.

6. An internal decomposition engine for monofuel comprising at least one cylinder, a cylinder head, monofuel injection and ignition means mounted in said head, a piston adapted for movement in said cylinder, sole exhaust means to exhaust said cylinder only when said piston is near bottom dead center, said cylinder being otherwise closed off throughout the stroke cycle of said piston to thereby permit retention and compression of exhaust gases in said cylinder, the injection of monofuel into said cylinder being limited to that portion of the piston stroke cycle near top dead center position, and means to link said piston to power output means.

7. An internal decomposition engine for burning monofuel comprising at least one cylinder closed at one end, monofuel injection and ignition means for said cylinder, a piston in said cylinder adapted for motion therein and sole exhaust means comprising ports in the wall of said cylinder adapted to be periodically exposed by said piston to the gases formed by the decomposition of the monofuel, said cylinder being otherwise closed off throughout the stroke of said piston to thereby permit retention and compression of exhaust gases in said cylinder.

8. An internal decomposition engine for monofuel comprising at least one cylinder, a cylinder head, monofuel injection and ignition means in said cylinder, a piston adapted for movement in said cylinder, sole exhaust means comprising ports in said cylinder arranged to exhaust decomposition gases only when said piston is near bottom dead center, said cylinder being otherwise closed off throughout the piston stroke cycle to thereby permit retention and compression of residual exhaust gases in said cylinder, the injection of monofuel into said cylinder being limited to that portion of the piston stroke near top dead center position whereby the monofuel is caused to decompose by the heat and pressure of said compressed residual exhaust gases, and means to link said piston to power output means.

9. The method of operating an internal decomposition engine which comprises compressing at least a portion of the products of decomposition in said engine and introducing a monofuel into the compressed decomposition products to cause decomposition of said monofuel.

10. The combination in a reciprocating engine adapted for use of monofuel without injection of separate reactant comprising in combination a cylinder closed at one end, a piston arranged to reciprocate in said cylinder, means to inject monofuel into said cylinder when its piston is substantially at one end of its stroke in time to be ignited solely by the heat from the compressed residual exhaust gases in said cylinder, and exhaust means to exhaust said cylinder only when said piston is near bottom dead center.

References Cited in the file of this patent

UNITED STATES PATENTS

| | | |
|---|---|---|
| 1,559,300 | Barnard | Oct. 27, 1925 |
| 1,559,301 | Barnard | Oct. 27, 1925 |
| 2,136,070 | Bokemuller | Nov. 8, 1938 |
| 2,138,301 | Howie | Nov. 29, 1938 |
| 2,499,642 | Hannum | Mar. 7, 1950 |

FOREIGN PATENTS

| | | |
|---|---|---|
| 733,385 | Great Britain | July 13, 1955 |